(12) United States Patent
Takahashi et al.

(10) Patent No.: US 10,209,408 B2
(45) Date of Patent: Feb. 19, 2019

(54) OPTICAL COMPONENT, INFRARED CAMERA, AND METHOD FOR MANUFACTURING OPTICAL COMPONENT

(71) Applicant: FUJIFILM Corporation, Tokyo (JP)

(72) Inventors: Hiroki Takahashi, Saitama (JP); Mototaka Kanaya, Sano (JP)

(73) Assignee: FUJIFILM Corporation, Tokyo (JP)

( * ) Notice: Subject to any disclaimer, the term of this patent is extended or adjusted under 35 U.S.C. 154(b) by 207 days.

(21) Appl. No.: 15/244,299

(22) Filed: Aug. 23, 2016

(65) Prior Publication Data

US 2016/0356926 A1    Dec. 8, 2016

Related U.S. Application Data

(63) Continuation of application No. PCT/JP2015/056220, filed on Mar. 3, 2015.

(30) Foreign Application Priority Data

Mar. 13, 2014  (JP) ................................. 2014-049613

(51) Int. Cl.
*G02B 1/118* (2015.01)
*C03C 3/32* (2006.01)
(Continued)

(52) U.S. Cl.
CPC .............. *G02B 1/118* (2013.01); *C03C 3/321* (2013.01); *C03C 17/007* (2013.01);
(Continued)

(58) Field of Classification Search
CPC ........... G02B 1/11; G02B 1/113; G02B 1/118; G02B 5/045; G02B 5/18; G02B 5/1809;
(Continued)

(56) References Cited

U.S. PATENT DOCUMENTS

2003/0201241 A1* 10/2003 Harker ................. B29C 59/022
                                                              216/2
2011/0244224 A1    10/2011 Kurihara
2016/0003981 A1*  1/2016 Twitchen ............... G02B 1/118
                                                              359/601

FOREIGN PATENT DOCUMENTS

JP            64-56401 A       3/1989
JP          11-281801 A      10/1999
(Continued)

OTHER PUBLICATIONS

English translation of the International Preliminary Examination Report, issued in PCT/JP2015/056220, dated Mar. 8, 2016.
International Preliminary Examination Report (PCT/IPEA/409 and PCT/IPEA/416), issued in PCT/JP2015/056220, dated Mar. 8, 2016.
International Search Report, issued in PCT/JP2015/056220 (PCT/ISA/210), dated Jun. 2, 2015.
(Continued)

*Primary Examiner* — Stephone B Allen
*Assistant Examiner* — Adam W Booher
(74) *Attorney, Agent, or Firm* — Birch, Stewart, Kolasch & Birch, LLP (57) ABSTRACT

The invention provides an optical component, an infrared camera including the optical component, and a method for manufacturing the optical component. Antireflection materials 3A are formed on a chalcogenide glass 2 of which a compositional ratio of germanium and selenium is 60 percent or greater. With respect to the antireflection materials 3A, an extinction coefficient to light of 10.5 μm is 0.01 or less, and a refractive index to light having a wavelength of 10.5 μm are greater than 1 and 2.6 or less. The antireflection materials 3A are formed on a surface of a chalcogenide glass 2 at an interval of 0.5 μm to 2.0 μm, so as to form an antireflection film 3. Adhesiveness of the antireflection film 3 is higher than that In a case where the surface of the chalcogenide glass 2 is evenly coated with the antireflection materials 3A.

20 Claims, 11 Drawing Sheets

(51) Int. Cl.
*C03C 17/00* (2006.01)
*G02B 1/113* (2015.01)
*H04N 5/33* (2006.01)

(52) U.S. Cl.
CPC ............ *C03C 17/008* (2013.01); *G02B 1/113* (2013.01); *H04N 5/33* (2013.01); *C03C 2217/445* (2013.01); *C03C 2217/732* (2013.01); *C03C 2218/119* (2013.01)

(58) Field of Classification Search
CPC .......... G02B 5/1866; G02B 2005/1804; G02B 1/111; C03C 3/321; C03C 17/007; C03C 17/008; C03C 2217/445; C03C 2217/73; C03C 2217/732; C03C 2218/119; H04N 5/33
See application file for complete search history.

(56) References Cited

FOREIGN PATENT DOCUMENTS

| | | |
|---|---|---|
| JP | 2003-215305 A | 7/2003 |
| JP | 2008-129197 A | 6/2008 |
| JP | 2010-46868 A | 3/2010 |
| JP | 2011-221048 A | 11/2011 |
| JP | 2011-237510 A | 11/2011 |

OTHER PUBLICATIONS

Notification of Reasons for Refusal issued in the corresponding JP application No. 2016-507469 dated Jun. 22, 2016 and the English translation thereof.
Written Opinion of the International Searching Authority, issued in PCT/JP2015/056220 (PCT/ISA/237), dated Jun. 2, 2015.

* cited by examiner

| EQUIVALENT REFRACTIVE INDEX OF ANTIREFLECTION FILM TO LIGHT HAVING WAVELENGTH OF 10.5 μm | AVERAGE THICKNESS d OF ANTIREFLECTION FILM [μm] | NUMBER OF ANTIREFLECTION FILMS [FILMS] (IN 10 μm×10 μm) | AVERAGE REFLECTIVITY TO LIGHT HAVING WAVELENGTH OF 8 μm TO 14 μm [%] | EVALUATION |
|---|---|---|---|---|
| 1.3 | 2.0 | 25 | 5.6 | BAD |
| 1.4 | 1.9 | 25 | 3.3 | NORMAL |
| 1.5 | 1.8 | 36 | 2.0 | FAVORABLE |
| 1.75 | 1.53 | 49 | 2.1 | FAVORABLE |
| 1.8 | 1.5 | 49 | 2.6 | FAVORABLE |
| 1.9 | 1.4 | 64 | 3.9 | NORMAL |
| 2.0 | 1.3 | 64 | 5.6 | BAD |

OPTICAL COMPONENT, INFRARED CAMERA, AND METHOD FOR MANUFACTURING OPTICAL COMPONENT

CROSS-REFERENCE TO RELATED APPLICATIONS

This application is a Continuation of PCT International Application No. PCT/JP2015/056220 filed on Mar. 3, 2015, which claims priority under 35 U.S.C § 119(a) to Japanese Patent Application No. 2014-049613 filed on Mar. 13, 2014. Each of the above application(s) is hereby expressly incorporated by reference, in its entirety, into the present application.

BACKGROUND OF THE INVENTION

1. Field of the Invention

The present invention relates to an optical component, an infrared camera, and a method for manufacturing an optical component.

2. Description of the Related Art

A chalcogenide glass is an appropriate optical member material that is not expensive and can be easily processed into a required optical element by molding, compared with germanium crystal and zinc selenide that have been used in the related art as materials of lenses for far infrared rays (in a wavelength of 8 μm to 14 μm). However, since a refractive index of a chalcogenide glass is 2.5 to 2.6 with respect to far infrared rays, the surface reflection is great and the transmittance remains at about 60%. Accordingly, it is difficult to obtain sufficient imaging light by merely processing a surface shape of a chalcogenide glass into a shape of a lens or the like. Therefore, an antireflection film for reducing the amount of the loss light due to surface reflection is provided on the surface of an optical element consisting of glass material for infrared rays (JP2011-221048A).

In an infrared transmissive optical element, the surface strength is increased in order to prevent scratches (JP1989-56401A (JP-S64-56401A)). Further, light may be efficiently emitted from an optical waveguide (JP2003-215305A).

SUMMARY OF THE INVENTION

The current mainstream antireflection film is a multilayer film obtained by combining a semiconductor and an oxide, a diamond-like carbon film, or the like, but all of these films are formed by using vacuum processes. Therefore, the antireflection film in the related art had a problem that adhesiveness between an optical member and an antireflection film was lowered due to great film stress, such that the film peeled off in some cases.

The invention is for providing an optical component in which adhesiveness of an antireflection film is favorable, an infrared camera, and a method for manufacturing an optical component.

An optical component according to a first invention comprises a chalcogenide glass of which a content ratio (compositional ratio) of germanium and selenium is 60 percent or greater; and an antireflection film in which antireflection materials of which an extinction coefficient to light having a wavelength of 10.5 μm is 0.01 or less, and a refractive index to light having a wavelength of 10.5 μm is greater than 1 and 2.6 or less are formed on a surface of a chalcogenide glass at an interval of 0.5 μm to 2.0 μm or the antireflection materials are formed on the surface of the chalcogenide glass and at least one hole having a maximum width of 0.5 μm to 2.0 μm is formed in the antireflection materials.

The antireflection materials include, for example, a diamond-like carbon or carbon.

An equivalent refractive index of the antireflection film to light having a wavelength of 10.5 μm is, for example, 1.4 to 1.9. The equivalent refractive index is determined by an area ratio of antireflection materials occupied by a unit area of an antireflection film. If a refractive index of antireflection materials is n1, a cubic volume of the antireflection materials is V1, a refractive index of the air is n2 (n2=1), and a cubic volume of the air is V2, an equivalent refractive index n of the antireflection film satisfies $n = n1 \times [V1/(V1+V2)] + n2 \times [V2/(V1+V2)]$. If a unit area of an antireflection film is S, an area of antireflection materials in the unit area S is S1, and an area of the air in the unit area S is S2, $n = n1 \times (S1/S) + (S2/S)$ is satisfied.

It is preferable that an equivalent refractive index of the antireflection film to light having a wavelength of 10.5 μm is 1.5 to 1.8.

It is preferable that a thickness d of the antireflection film is 8/4n to 14/4n.

It is preferable that a plurality of the holes are formed.

An infrared camera comprising one or a plurality of the optical components may be provided.

A method for manufacturing an optical component according to a second invention comprises: coating a surface of a chalcogenide glass base material of which a content ratio (compositional ratio) of germanium and selenium is 60 percent or greater with antireflection materials having ultraviolet ray curing characteristics or characteristics of being cured with light having a specific wavelength of which an extinction coefficient to light having a wavelength of 10.5 μm is 0.01 or less, and a refractive index to light having a wavelength of 10.5 μm is greater than 1 and 2.6 or less, at an interval of 0.5 μm to 2.0 μm, and irradiating the coated antireflection materials with ultraviolet rays or light having a specific wavelength, so as to form an antireflection film.

A method for manufacturing an optical component according to a third invention comprises: coating a surface of a chalcogenide glass base material of which a content ratio (compositional ratio) of germanium and selenium is 60 percent or greater with antireflection materials having ultraviolet ray curing characteristics or characteristics of being cured with light having a specific wavelength of which an extinction coefficient to light having a wavelength of 10.5 μm is 0.01 or less, and a refractive index to light having a wavelength of 10.5 μm is greater than 1 and 2.6 or less, irradiating and curing the applied antireflection materials with ultraviolet rays or light having a specific wavelength, and removing the cured antireflection materials such that the cured antireflection materials remain at an interval of 0.5 μm to 2.0 μm, so as to form an antireflection film, or forming holes having a maximum width of 0.5 μm to 2.0 μm in the cured antireflection materials so as to form an reflection film.

According to the first invention, since the antireflection materials of which an extinction coefficient to light having a wavelength of 10.5 μm is 0.01 or less are used, it is possible for infrared rays to be transmitted. Since the antireflection materials of which a refractive index to light having a wavelength of 10.5 μm is greater than 1 which is a refractive index of the air and equal to or less than 2.6 which is a refractive index of the chalcogenide glass are used, the antireflection materials function as an antireflection film. Also, since the antireflection materials as above are formed on the surface of the chalcogenide glass at an interval of 0.5 μm to 2.0 μm or the antireflection materials are formed on the surface of the chalcogenide glass, and holes having a maximum width of 0.5 μm to 2.0 μm are formed in the antireflection material, compared with a case where the surface of the chalcogenide glass is evenly coated with the antireflection materials, adhesiveness of the antireflection film increases.

According to the second invention, it is possible to manufacture the optical component having high adhesiveness of the antireflection film.

According to the third invention, it is also possible to manufacture the optical component having high adhesiveness of the antireflection film.

DESCRIPTION OF THE PREFERRED EMBODIMENTS

Figure 1:
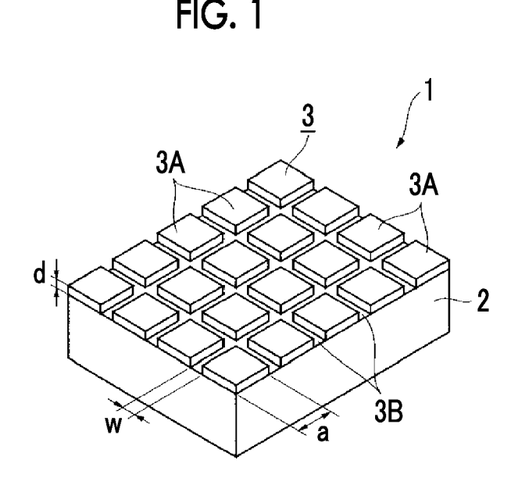
FIG. 1 is a perspective view of an optical component.
Figure 2:
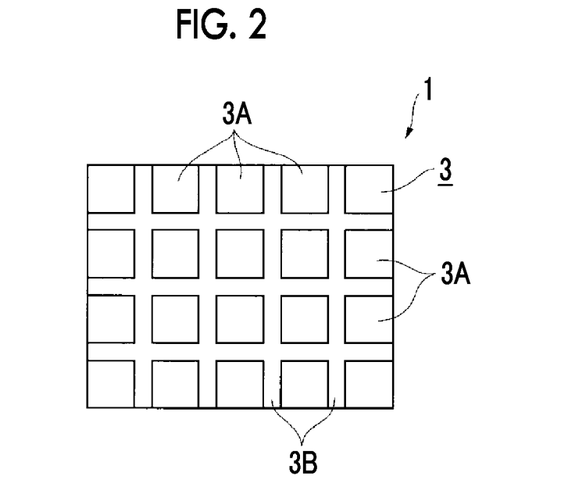
FIG. 2 is a plan view of the optical component.
Figure 3:
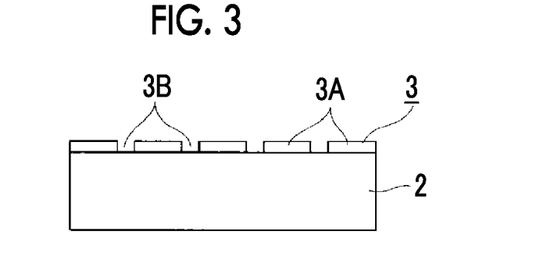
FIG. 3 is a side view of the optical component.

FIGS. 1 to 3 are diagrams illustrating a first embodiment of the invention and illustrate a portion of an optical component (lens) 1. FIG. 1 is a perspective view of the optical component 1, FIG. 2 is a plan view of the optical component 1, and FIG. 3 is a side view of the optical component 1.

A chalcogenide glass 2 having a content ratio (compositional ratio) of germanium and selenium is 60 percent or greater is included in the optical component 1. Antireflection materials 3A (rectangle of which a side is a μm) of which an extinction coefficient to light having a wavelength of 10.5 μm is 0.01 or less and a refractive index to light having a wavelength 10.5 μm is greater than 1 and 2.6 or less are formed on the surface of the chalcogenide glass 2 at an interval w of 0.5 μm to 2.0 μm. An antireflection film 3 is formed with these plural antireflection materials 3A and air layer 3B formed between the antireflection materials 3A.

Diamond-like carbon or carbon is preferably included in these antireflection materials 3A. Particularly, $Al_2O_3$, Bi, $Gd_2O_3$, SiON, $Ta_2O_5$, $ZnO_2$, ZnSe, ZnS, and the like may be included in the antireflection materials 3A.

In a case where an equivalent refractive index of the antireflection film 3 is n, the thickness d [μm] of the antireflection film 3 (the antireflection materials 3A) is preferably 8/4n to 14/4n, such that an antireflection function in wavelengths of 8 μm to 14 μm is obtained.

In a case where a unit area of the antireflection film is 10 μm×10 μm, a refractive index n1 of the antireflection materials 3A is 2.6, and an area ratio of the antireflection material 3A for each unit area of the antireflection film 3 is 0.3, the equivalent refractive index n of the antireflection film 3=1× 0.7+2.6×0.3=1.48. Accordingly, the thickness d [μm] of the antireflection film 3 is preferably 8/(4×1.48)=1.35 [μm] to 14/(4×1.48)=2.36 [μm]. As described above, an equivalent refractive index is determined by an area ratio of an antireflection material occupied in a unit area of the antireflection film. An area ratio of the antireflection materials 3A for each unit area of the antireflection film 3 is determined by a length a of a side of the antireflection materials 3A and the interval w of the antireflection materials 3A. That is, the length a of a side of the antireflection materials 3A and the interval w are determined by matching with a desired equivalent refractive index.

An equivalent refractive index of the antireflection film 3 is preferably 1.4 to 1.9 and more preferably 1.5 to 1.8.

Figure 4A:
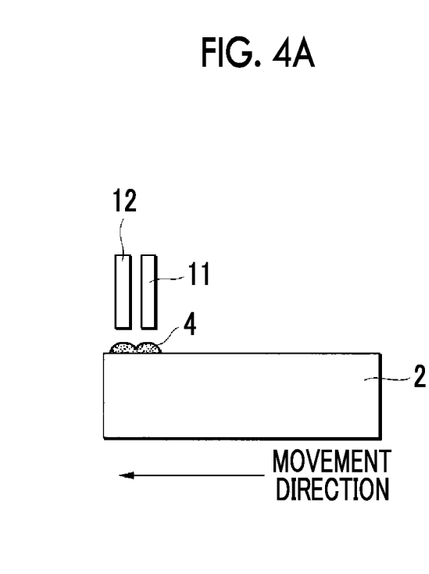
FIGS. 4A to 4C are diagrams illustrating steps for manufacturing an optical component.
Figure 4B:
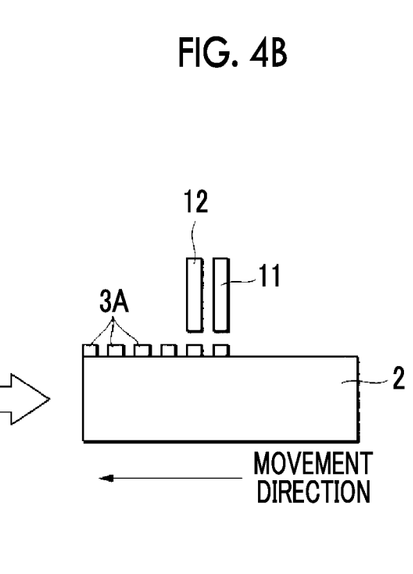
Figure 4C:
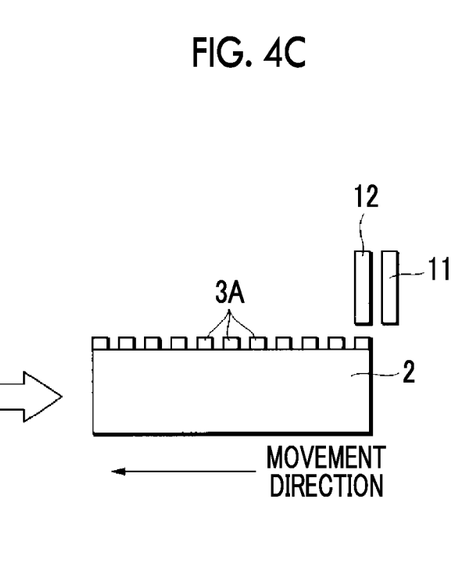

FIGS. 4A to 4C are diagrams illustrating a first manufacturing step of the optical component 1 in a chronological order indicated by an outlined arrow.

The chalcogenide glass (chalcogenide glass base material) 2 is mounted on a high precision stage (not illustrated) of an ink jet coating device. In the chalcogenide glass 2, a content ratio (compositional ratio) of germanium and selenium is 60 percent or greater. As illustrated in FIG. 4A, while the chalcogenide glass 2 is precisely moved by computer control in a direction indicated by a black arrow in the figure, ultraviolet ray cured resins 4 which are raw materials of the antireflection materials 3A are added dropwisely at a regular interval so as to be dot shapes from an ink jet nozzle 11 to the surface of the chalcogenide glass 2. In the first manufacturing method, the ultraviolet ray cured resins 4 are added dropwisely on the surface of the chalcogenide glass base material at an interval of 0.5 μm to 2.0 μm. In the ultraviolet ray cured resin 4, an extinction coefficient to light having a wavelength of 10.5 μm is 0.01 or less, and a refractive index to light having a wavelength of 10.5 μm is greater than 1 and 2.6 or less, and the ultraviolet ray cured resin 4 has characteristics of being cured with ultraviolet rays. For example, the ultraviolet ray cured resin 4 is obtained by causing an olefin-based ultraviolet ray cured resin having characteristics of transmitting light having a wavelength of 10.5 μm to include diamond-like carbon or carbon.

Subsequently, as illustrated in FIGS. 4B and 4C, the ultraviolet ray cured resins 4 added dropwisely at a regular interval are immediately cured by ultraviolet rays emitted from an ultraviolet ray irradiating nozzle 12. Accordingly, the ultraviolet ray cured resins 4 are cured to become the antireflection materials 3A. In the same manner, the antireflection film 3 is formed by forming the antireflection materials 3A on the surface of the chalcogenide glass 2 in a desired range. The dropwise addition and curing of the ultraviolet ray cured resins 4 may be performed once or may be performed plural times. In this embodiment, the antireflection materials 3A are formed by three times of dropwise addition. Specifically, In a case where the dropwise addition of the ultraviolet ray cured resins 4 and the curing with the ultraviolet ray irradiation are performed once, the dropwise addition of the ultraviolet ray cured resins 4 and the curing with the ultraviolet ray irradiation are performed three times in total in the same position, so as to form the antireflection materials 3A. In the forming of the antireflection film 3, it is obvious that the thickness d [μm] of the antireflection materials 3A is determined so as to be a preferable thickness described above.

In the embodiment described above, the ultraviolet ray cured resin is used as the antireflection material, but the antireflection film may be formed by coating the surface of the chalcogenide glass 2 with a light cured resin that is cured with light having a specific wavelength and curing the light cured resin by irradiation with light having a specific wavelength. The antireflection material is not limited to the light cured resin, and other energy curing-type resins may be used. For example, a thermosetting resin may be used.

FIGS. 5A to 5D are diagrams indicating a second manufacturing step of the optical component 1 in a chronological order indicated by an outlined arrow.

Figure 5A:
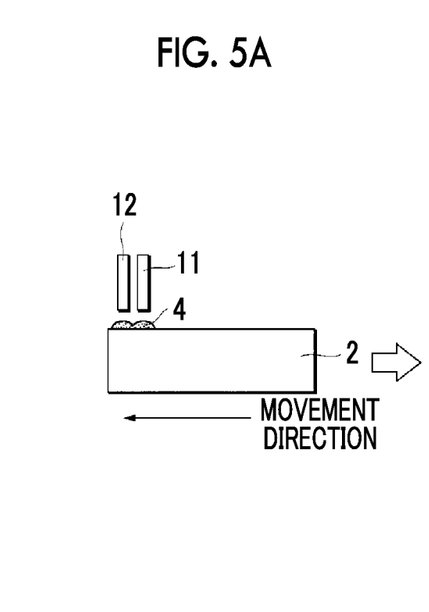
FIGS. 5A to 5D are diagrams illustrating steps for manufacturing an optical component.
Figure 5B:
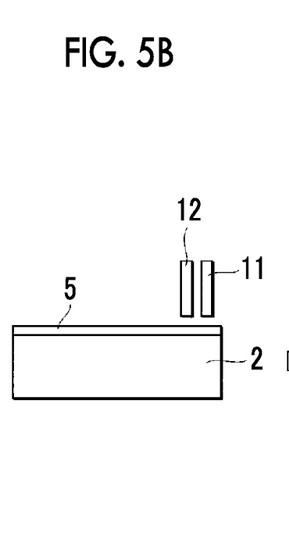

As illustrated in FIG. 5A, while the chalcogenide glass 2 is moved in a black arrow direction in the figure, the ultraviolet ray cured resins 4 are added dropwisely by the ink jet nozzle 11, and the entire surface of the chalcogenide glass 2 is coated with the ultraviolet ray cured resins 4. As illustrated in FIG. 5B, the ultraviolet ray cured resins 4 with which the chalcogenide glass 2 is coated while being moved is immediately cured by ultraviolet rays applied from the ultraviolet ray curing nozzle 12. In this manner, the coating layer 5 obtained by curing the ultraviolet ray cured resins 4 is formed. In a second manufacturing method, in the ultraviolet ray cured resin 4, an extinction coefficient to light having a wavelength of 10.5 μm is 0.01 or less, a refractive index to light having a wavelength of 10.5 μm is greater than 1 and 2.6 or less, and the ultraviolet ray cured resin 4 has characteristics of being cured with ultraviolet rays. In the chalcogenide glass 2 according to the embodiment, a content ratio (compositional ratio) of germanium and selenium is 60 percent or greater. In the forming of this coating layer 5, the thickness of the coating layer 5 is determined so as to be the preferable thickness d of the antireflection film 3 described above.

Figure 5C:
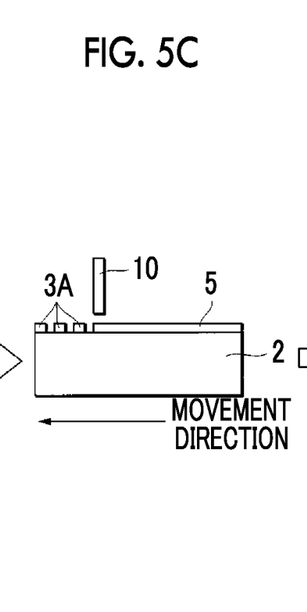
Figure 5D:
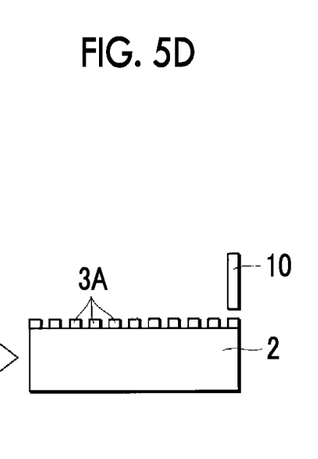

As illustrated in FIG. 5C, unnecessary portions are removed by performing laser irradiation on the unnecessary portions in the coating layer 5 by a pulse laser 10. The removing treatment is performed on the entire coating layer 5. As illustrated in FIG. 5D, the antireflection materials 3A are formed at a regular interval in dot shapes by performing this treatment in the vertical and horizontal directions of a base material surface. In this embodiment, an antireflection film is formed by leaving the antireflection materials 3A at an interval of 0.5 μm to 2.0 μm and removing the other antireflection materials 3A.

EXAMPLES

Hereinafter, the first embodiment of the invention is described with reference to examples, but the invention is not limited thereto.

Example 1

In the conditions described below, an antireflection film is formed by using the first manufacturing method so as to produce a sample of an optical component.

<Antireflection Material>

Antireflection materials obtained by mixing carbon particles (obtained by grinding C film of which an average particle diameter is 0.3 μm) with olefin-based UV curing resins were used. In this antireflection material, a refractive index to light having a wavelength of 10.5 μm was 2.6. The surface tension of this antireflection material was 30 mN/m, and the viscosity was 20 cps.

<Ink Jet Coating Device>

An IJ head (Model No. PN700-10701-01) manufactured by Dimatix, Inc. was used as an ink jet coating device. A nozzle diameter of this device was 20 and a discharge amount was 15 pliters/time. In this example, discharging and curing of the ultraviolet ray cured resin were performed for three times, so as to form an antireflection film consisting of a dot-shaped antireflection material. Here, as the ultraviolet rays (UV) for curing the ultraviolet ray cured resin, a light source having a wavelength of 385 nm was used. The irradiation intensity of the light source was 2 W/cm$^2$. In order to promote the curing of the resin, a sample in which the dot-shaped antireflection materials were formed was annealed at 100° C., for two hours in a nitrogen atmosphere.

<Dot Shape>

In a dot of the antireflection material, an average height h was 1.75 μm and the length a of one side was 1 μm. The number of dots in 10 μm$^2$ of the chalcogenide glass surface was 30, and the interval w between dots was 1 μm.

<Measuring of Equivalent Refractive Index After Coating>

Dots of the antireflection material are formed on a plate of a chalcogenide preform (composition: $Ge_{20}Se_{70}Sb_{10}$ manufactured by Opto Create Co., Ltd.), an ellipsometer (Model No.: IR-VASE manufactured by J. A. Woollam Co., Inc.) was used, so as to measure an equivalent refractive index of the antireflection film.

<Transmittance Characteristic Measuring Sample>

A chalcogenide preform (composition: $Ge_{20}Se_{70}Sb_{10}$ manufactured by Opto Create Co., Ltd.) was molded on a lens (maximum thickness of 2 mm), an antireflection film consisting of dots of the antireflection material was formed on the surface thereof, so as to produce a sample. The antireflection films were formed on both surfaces of the lens.

<Measuring Transmittance>

Transmittance of the sample was measured by using an infrared spectrophotometer (FT-IR8500 manufactured by Shimadzu Corporation). The measured light was incident to the center of the lens.

Figure 6:
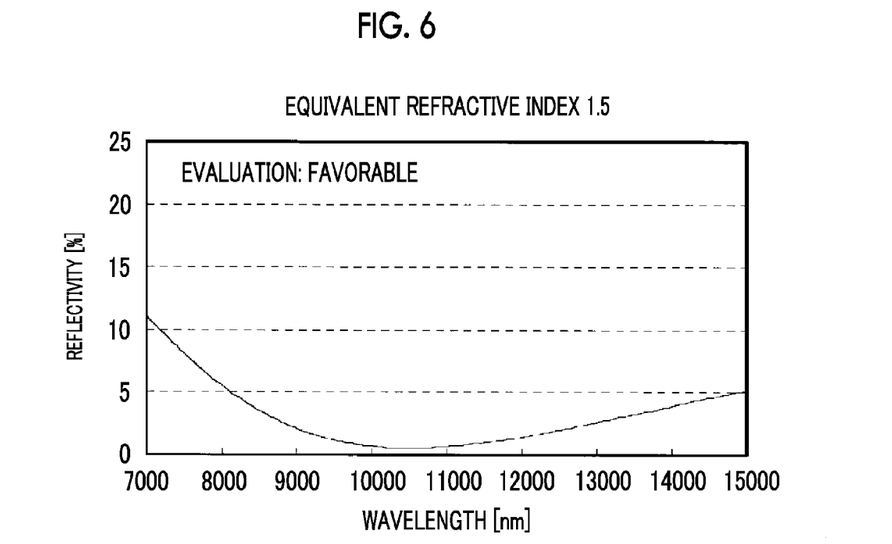
FIG. 6 is a graph illustrating reflectivity characteristics of an optical component.

FIG. 6 is a graph indicating an example of reflectivity characteristics of the optical component 1.

The reflectivity characteristics illustrated in FIG. 6 are those In a case where an equivalent refractive index of the antireflection film 3 of the optical component 1 is 1.5. In FIG. 6, a horizontal axis represents wavelengths of light incident to the optical component 1 and a vertical axis represents reflectivity. Specifically, the light having a wavelength of 7,000 nm to 15,000 nm was incident to the lens on which the antireflection films were formed as above, transmittance T was measured respectively, and reflectivity R was subsequently calculated according to an equation of R=100-T from the transmittance T of the light, so as to calculate reflectivity characteristics illustrated in FIG. 6.

As clearly shown in FIG. 6, it was possible to obtain the optical component 1 having favorable reflectivity characteristics in which average reflectivity to the light having a wavelength of 8 μm to 14 μm was about 3% or less, and in particular, reflectivity with respect to the light having a wavelength of about 10.5 μm was low. Here, average reflectivity was calculated as below. First, the transmittance T of the light having a wavelength of 8 µm to 14 µm was measured at an interval of 4 cm$^{-1}$, and reflectivity R of the respective measurement wavelengths from the equation of R=100-T was calculated respectively. Subsequently, calculated reflectivity to the light having respective wavelengths was summed, and a value obtained by dividing the summed value by the number of measured points was set to average reflectivity. The measuring of the transmittance of the light was based on transmittance of a chalcogenide glass substrate to which no antireflection film was provided. Hereinafter, in evaluation of average reflectivity to light having the wavelength range of 8 µm to 14 µm, a value of less than 3% was set to be "favorable", a value of 3% to 4% was "normal", and a value of greater than 4% was "bad".

<Reliability Test>

A sample of which an equivalent refractive index of the antireflection film created as above was 1.5 was left for 240 hours under the environment of the relative humidity of 90% and 90° C., and appearance inspection, a peeling test, and optical measuring were performed.

<Appearance Inspection>

Peeling of the antireflection film was checked by using a microscope, but there was no peeling on the antireflection film.

<Peeling Test>

A peeling test was performed according to the JIS K5600 standard. As a result, it was checked that there was no peeling on the antireflection film.

<Optical Characteristics>

With this sample, in the same manner as above, the measuring of the reflectivity characteristics was performed. As a result, reflectivity characteristics which are the same as in FIG. 6 were able to be obtained.

From the above, it was checked that the antireflection film of the sample had practically no problem in the range of the usage wavelength.

In the same manner, dot-shaped antireflection films obtained by adjusting the length a of one side of the antireflection materials 3A and the interval w such that equivalent refractive indexes became 1.3, 1.4, 1.75, 1.8, 1.9, and 2.0 were formed on plate-shaped chalcogenide (thickness of 2 mm) substrates, transmittance of these antireflection films were measured and reflectivity characteristics were evaluated.

Figure 7:
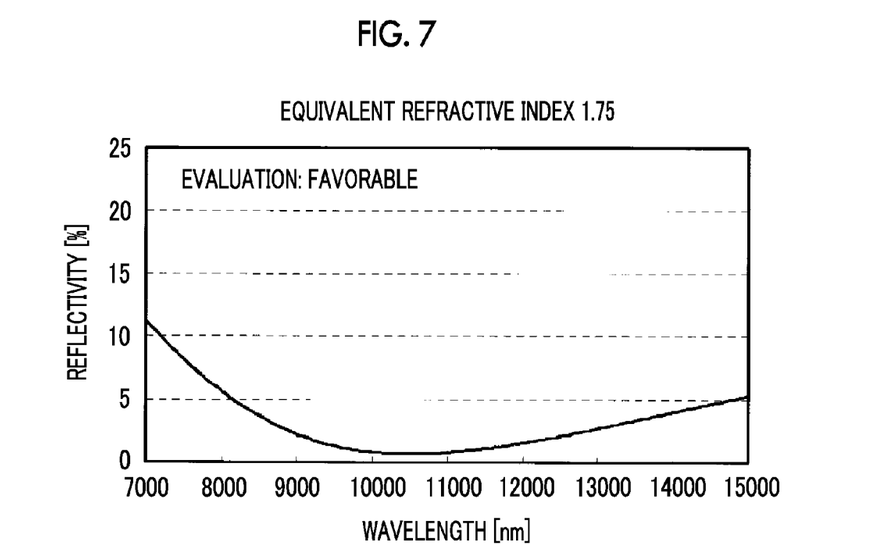
FIG. 7 is a graph illustrating reflectivity characteristics of an optical component.
Figure 8:
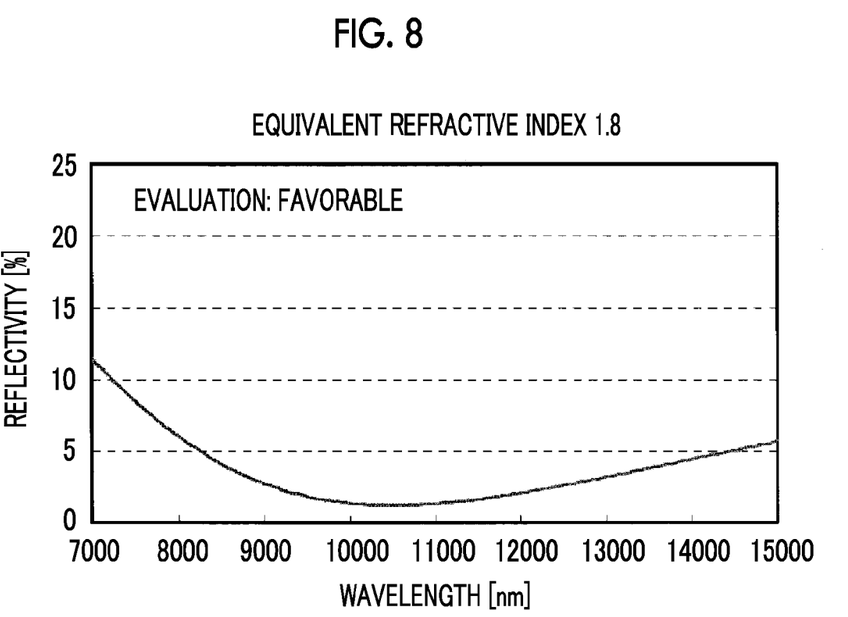
FIG. 8 is a graph illustrating reflectivity characteristics of an optical component.

FIG. 7 is a graph illustrating reflectivity characteristics of the optical component 1 on which the antireflection film 3 having an equivalent refractive index of 1.75 is formed. FIG. 8 is a graph illustrating reflectivity characteristics of the optical component 1 on which the antireflection film 3 having an equivalent refractive index of 1.8 is formed.

In FIGS. 7 and 8, in the same manner as in FIG. 6, horizontal axes represent wavelengths of light incident to the optical component 1 and vertical axes represent reflectivity.

In a case where an equivalent refractive index of the antireflection film 3 was 1.75 or 1.8, the optical component 1 having "favorable" reflectivity characteristics that is substantially same as in a case where an equivalent refractive index was 1.5, was able to be obtained.

As above, it was possible to understand that favorable reflectivity characteristics was able to be obtained in all conditions from the case of using the antireflection film 3 having an equivalent refractive index of 1.5 to the case of using the antireflection film 3 having an equivalent refractive index of 1.8 in the optical component 1. That is, it was possible to check that the antireflection film according to the invention had great manufacturing tolerance (allowable error).

Figure 9:
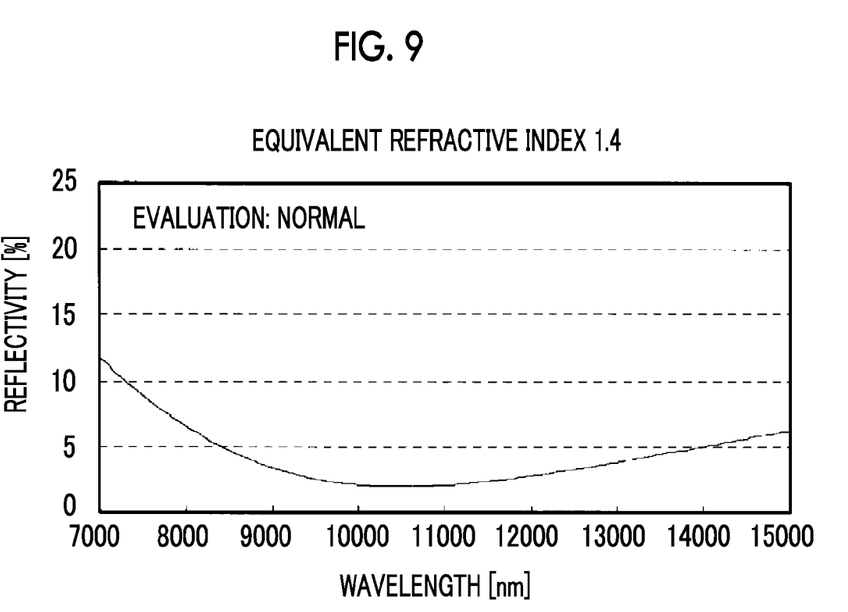
FIG. 9 is a graph illustrating reflectivity characteristics of an optical component.
Figure 10:
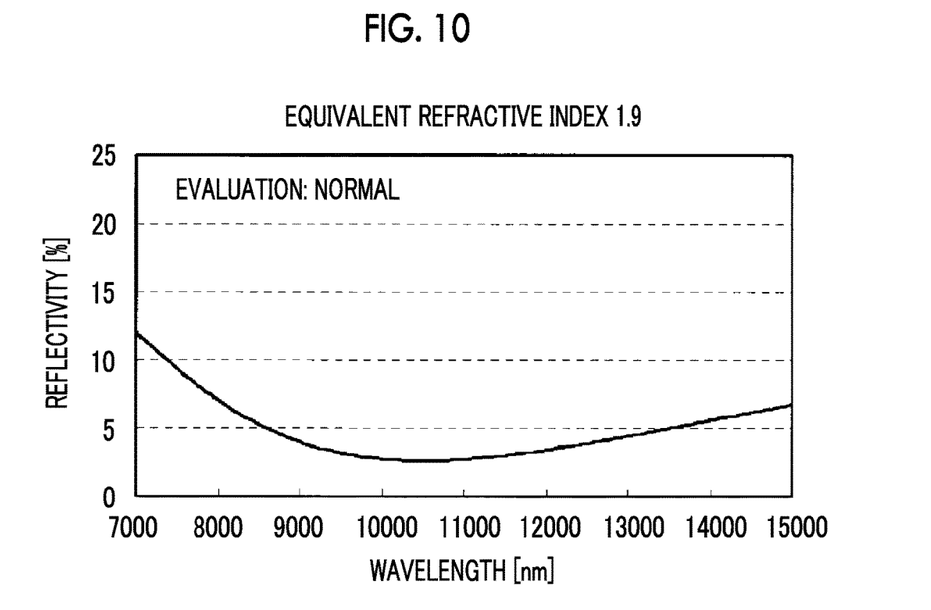
FIG. 10 is a graph illustrating reflectivity characteristics of an optical component.

FIG. 9 is a graph indicating reflectivity characteristics of the optical component 1 on which the antireflection film 3 having an equivalent refractive index of 1.4 is formed. FIG. 10 is a graph indicating reflectivity characteristics of the optical component 1 on which the antireflection film 3 having an equivalent refractive index of 1.9 is formed.

Also in FIGS. 9 and 10, horizontal axes represent wavelengths of light incident to the optical component 1 and vertical axes represent reflectivity.

In the examples indicated in FIGS. 9 and 10, it is possible to understand that average reflectivity to light having wavelengths of 8 µm to 14 µm was 3% to 4%, and had "normal" reflectivity characteristics.

Figure 11:
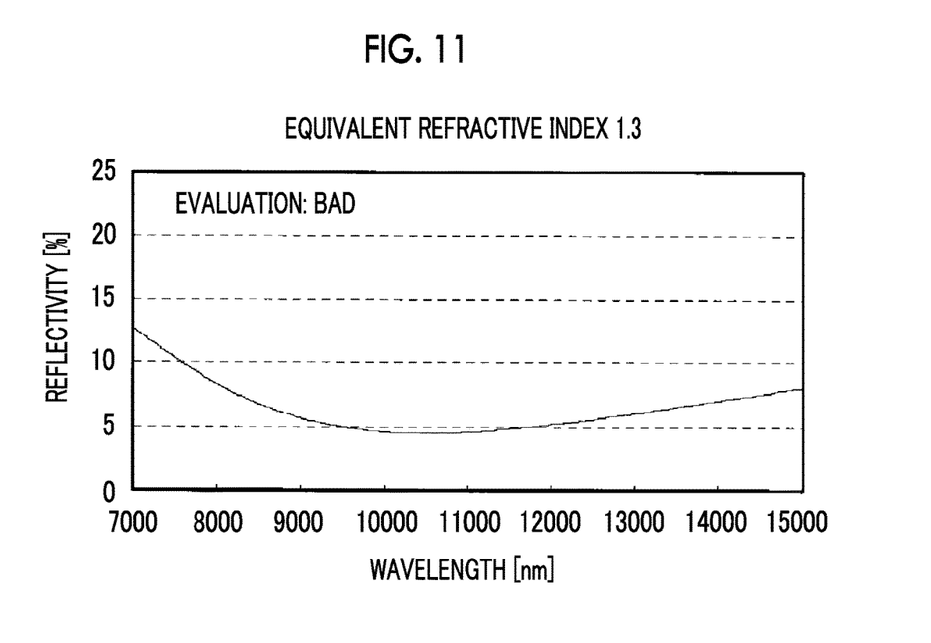
FIG. 11 is a graph illustrating reflectivity characteristics of an optical component.
Figure 12:
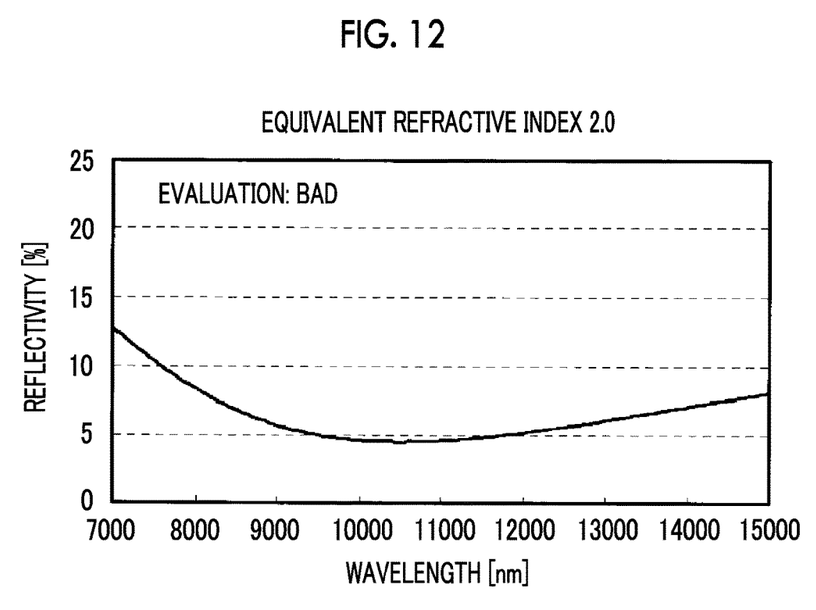
FIG. 12 is a graph illustrating reflectivity characteristics of an optical component.

FIG. 11 is a graph indicating reflectivity characteristics of the optical component 1 on which the antireflection film 3 having an equivalent refractive index of 1.3 is formed. FIG. 12 is a graph indicating reflectivity characteristics of the optical component 1 on which the antireflection film 3 having an equivalent refractive index of 2.0 is formed.

Also in FIGS. 11 and 12, horizontal axes represent wavelengths of light incident to the optical component 1 and vertical axes represent reflectivity.

In the examples indicated in FIGS. 11 and 12, it is possible to understand that average reflectivity to light having wavelengths of 8 µm to 14 µm was greater than 4%, and had "bad" reflectivity characteristics.

Figure 13:
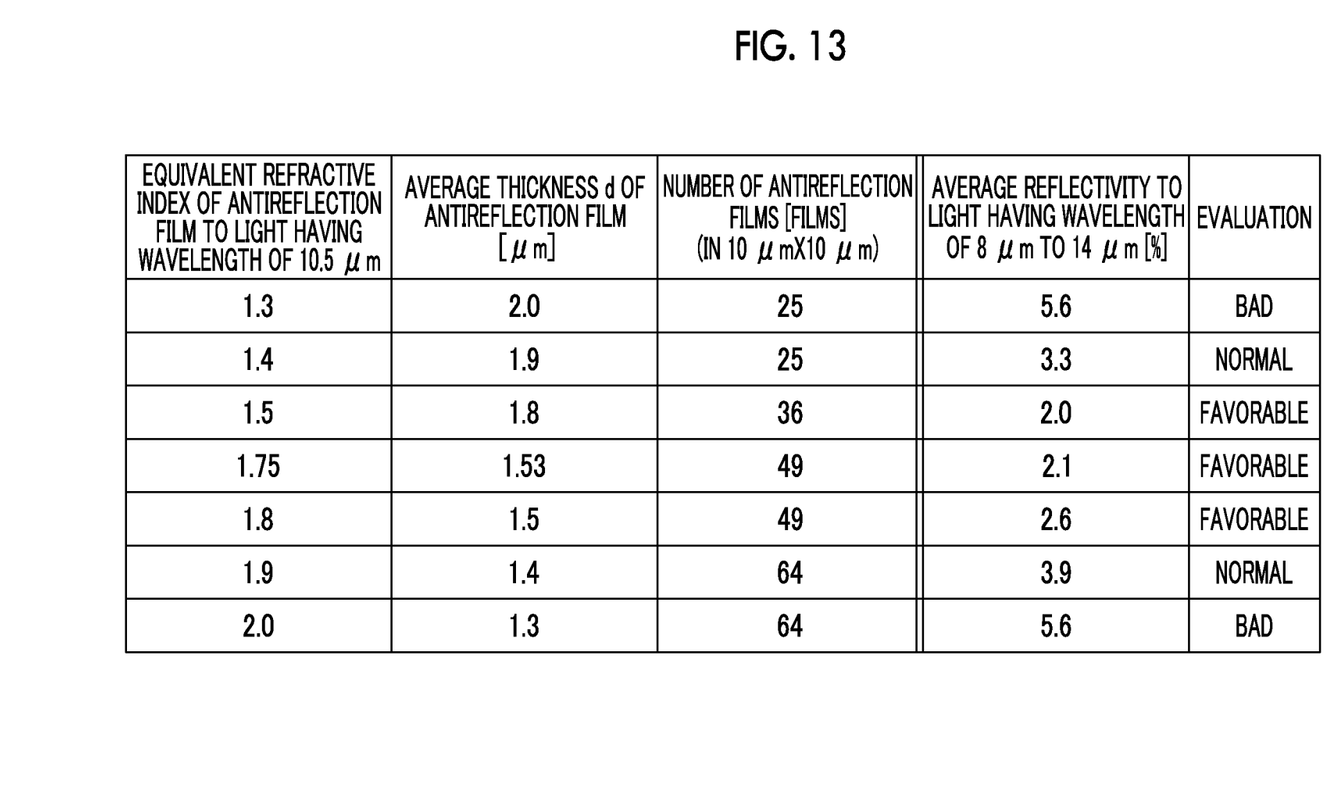
FIG. 13 is a table illustrating reflectivity characteristics of an optical component.

FIG. 13 is a table indicating the relationship between equivalent refractive indexes of the antireflection film 3 and average reflectivity.

The equivalent refractive index of the antireflection film 3 is a value with respect to light having a wavelength of 10.5 µm, and the average reflectivity is average reflectivity [%: percent] to light having a wavelength of 8 µm to 14 µm.

In a case where the equivalent refractive index is 1.3, for example, the average thickness d of the antireflection materials 3A is 2.0 µm, and the number of the antireflection materials 3A in 10 µm×10 µm is 25. In this case, average reflectivity becomes 5.6% and evaluated to be "bad" as above.

In a case where an equivalent refractive index is 1.4, for example, the average thickness d of the antireflection materials 3A is 1.9 µm, and the number of the antireflection materials 3A in 10 µm×10 µm is 25. In this case, average reflectivity becomes 3.3%, and evaluated to be "normal" as above.

In a case where an equivalent refractive index is 1.5, for example, the average thickness d of the antireflection materials 3A is 1.8 µm, and the number of the antireflection materials 3A in 10 µm×10 µm is 36. In this case, average reflectivity becomes 2.0%, and evaluated to be "favorable" as above.

In a case where an equivalent refractive index is 1.75, for example, the average thickness d of the antireflection materials 3A is 1.53 µm, and the number of the antireflection materials 3A in 10 µm×10 µm is 49. In this case, average reflectivity becomes 2.1%, and evaluated to be "favorable" as above.

In a case where an equivalent refractive index is 1.8, for example, the average thickness d of the antireflection materials 3A is 1.5 and the number of the antireflection materials 3A in 10 µm×10 µm is 49. In this case, average reflectivity becomes 2.6%, and evaluated to be "favorable" as above.

In a case where an equivalent refractive index is 1.9, for example, the average thickness d of the antireflection materials 3A is 1.4 and the number of the antireflection materials 3A in 10 μm×10 μm is 64. In this case, average reflectivity becomes 3.9%, and evaluated to be "normal" as above.

In a case where an equivalent refractive index is 2.0, for example, the average thickness d of the antireflection materials 3A is 1.3 and the number of the antireflection materials 3A in 10 μm×10 μm is 64. In this case, average reflectivity becomes 5.6%, and evaluated to be "bad" as above.

Example 2

According to the conditions described below, a sample of an optical component was produced by forming an antireflection film by using the second manufacturing method.

<Antireflection Material>

Antireflection materials obtained by mixing carbon particles (obtained by grinding diamond like carbon film of which an average particle diameter is 0.3 μm) with olefin-based UV curing resins were used. In this antireflection material, a refractive index to light having a wavelength of 10.5 μm was 2.6. The surface tension of this antireflection material was 30 mN/m, and the viscosity was 20 cps.

<Ink Jet Coating Device>

An IJ head (Model No. PN700-10701-01) manufactured by Dimatix, Inc. was used as an ink jet coating device. A nozzle diameter of this device was 20and a discharge amount was 15 pliters/time. In this example, discharging and curing of the ultraviolet ray cured resin were performed for three times, so as to form an antireflection film consisting of dot-shaped antireflection materials. Here, as the ultraviolet rays (UV) for curing the ultraviolet ray cured resin, a light source having a wavelength of 385 nm was used. The irradiation intensity of the light source was 2 W/cm$^2$. In order to promote the curing of the resin, a sample in which the dot-shaped antireflection materials were formed was annealed at 100° C., for two hours in a nitrogen atmosphere.

<Pulse Laser Condition>

A laser device (Model No. MD-V9920) manufactured by KEYENCE Corporation was used as a device for applying a pulse laser. A laser beam diameter was 1 μm (1/e$^2$), intensity was 10 W/cm$^2$, and Q switch frequency was 400 kHz.

<Dot Shape>

In a dot of the antireflection material, an average height h was 1.75 μm and the length a of one side was 1. The number of dots in 10 μm$^2$ of the chalcogenide glass surface was 30, and the interval w between dots was 1.

<Measuring of Equivalent Refractive Index After Coating>

An antireflection film consisting of dots of the antireflection material are formed on a plate of a chalcogenide preform (composition: $Ge_{20}Se_{70}Sb_{10}$ manufactured by Opto Create Co., Ltd.), and an equivalent refractive index of the antireflection film was measured by using an ellipsometer (Model No.: IR-VASE manufactured by J. A. Woollam Co., Inc.).

<Transmittance Characteristic Measuring Sample>

A chalcogenide preform (composition: $Ge_{20}Se_{70}Sb_{10}$ manufactured by Opto Create Co., Ltd.) was molded on a lens (maximum thickness of 2 mm), an antireflection film consisting of dots of the antireflection material was formed on the surface thereof, so as to produce a sample. The antireflection films were formed on both surfaces of the lens.

<Transmittance Characteristics and Reflectivity Characteristics>

With respect to the sample produced as above, according to the same method as Example 1, transmittance characteristics and reflectivity characteristics were measured. As a result, reflectivity characteristics thereof were substantially the same as those in the graph illustrated in FIG. 9. Accordingly, it was checked that, even if the second manufacturing method was used, it is possible to manufacture an optical component in which antireflection films having the same reflectivity characteristics as in the first manufacturing method are formed.

FIGS. 14 to 18 illustrate the second embodiment of the invention. In the second embodiment, holes are formed in the antireflection film. These holes may have any shapes, and holes having a maximum width (maximum length of holes) L of 0.5 μm to 2.0 μm may be formed.

Figure 14:
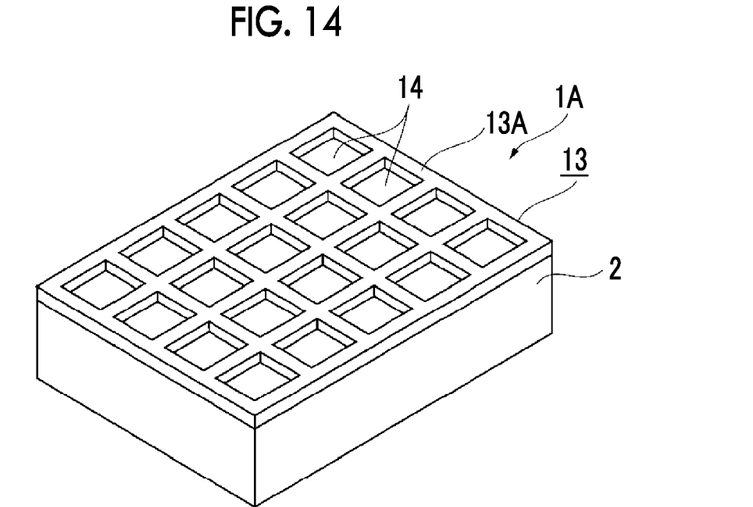
FIG. 14 is a perspective view of an optical component.
Figure 15:
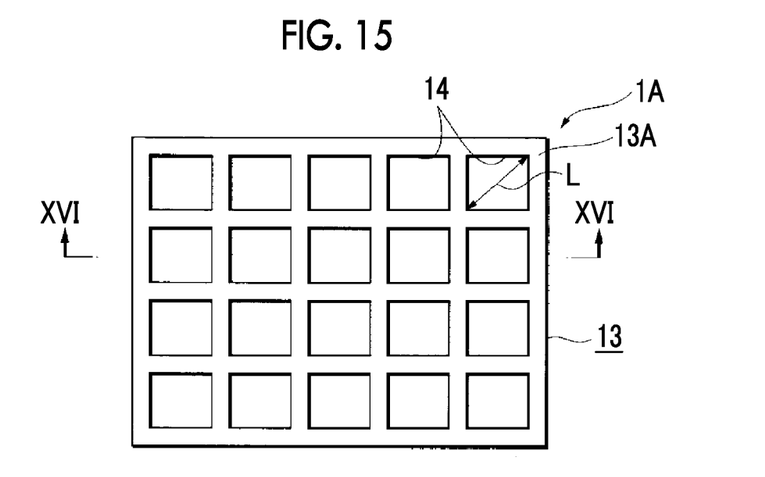
FIG. 15 is a plan view of the optical component.
Figure 16:
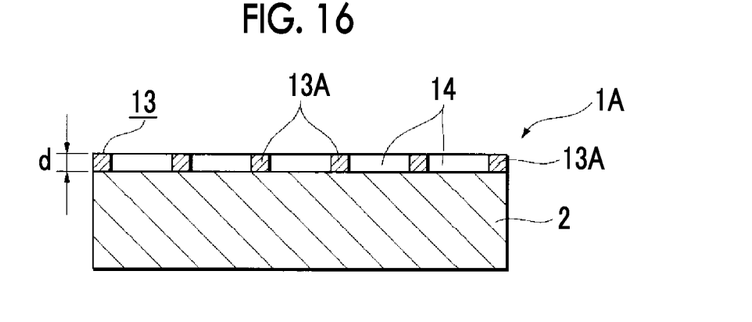
FIG. 16 is a sectional view of the optical component taken along line XVI-XVI.

FIG. 14 is a perspective view of the optical component 1A and corresponds to FIG. 1. FIG. 15 is a plan view of the optical component 1A, and corresponds to FIG. 2. FIG. 16 is a sectional view of the optical component 1A taken along line XVI-XVI of FIG. 15.

An antireflection material 13A having the same characteristics as the antireflection material 3A described above is formed on the surface of the chalcogenide glass 2. That is, in the antireflection material 13A, an extinction coefficient to light having a wavelength of 10.5 μm was 0.01 or less, and a refractive index to light having a wavelength of 10.5 μm was greater than 1 and 2.6 or less. Holes 14 are formed in the antireflection material 13A. The holes 14 are rectangle, and the maximum width thereof (in this case, length of a diagonal line) L is 0.5 μm to 2.0 μm. An antireflection film 13 is formed with the antireflection material 13A and the holes 14.

Diamond-like carbon or carbon is preferably included in the antireflection material 13A, in the same manner as in the antireflection materials 3A. Particularly, $Al_2O_3$ (a refractive index to light having a wavelength of 10.5 μm is 1.6), Bi (the refractive index is 1.9), $Gd_2O_3$ (the refractive index is 1.9), SiON (the refractive index is 2 to 1.6), $Ta_2O_5$ (the refractive index is 2.1), $ZnO_2$ (the refractive index is 2.03), ZnSe (the refractive index is 2.39), ZnS (the refractive index is 2.2), and the like may be included in the antireflection material 13A.

In the same manner as in the antireflection film 3. In a case where an equivalent refractive index of the antireflection film 13 is n, the thickness d [μm] of the antireflection film 13 (the antireflection materials 13A) is preferably 8/4n to 14/4n, such that an antireflection function to light having wavelengths of 10.5 μm is obtained. It is obvious that the equivalent refractive index n of the antireflection film 13 is determined in an area ratio of the antireflection material 13A, in the same manner as in the antireflection film 3. The equivalent refractive index of the antireflection film 13 is preferably 1.4 to 1.9 and more preferably 1.5 to 1.8.

The optical component 1A indicated from FIGS. 14 to 16 can be manufactured by the method described with reference to FIG. 5. Particularly, as illustrated in FIG. 4, the optical component 1A can be manufactured by applying the ultraviolet ray cured resin according to the shape of the antireflection material 13A and curing the ultraviolet ray cured resin.

Figure 17:
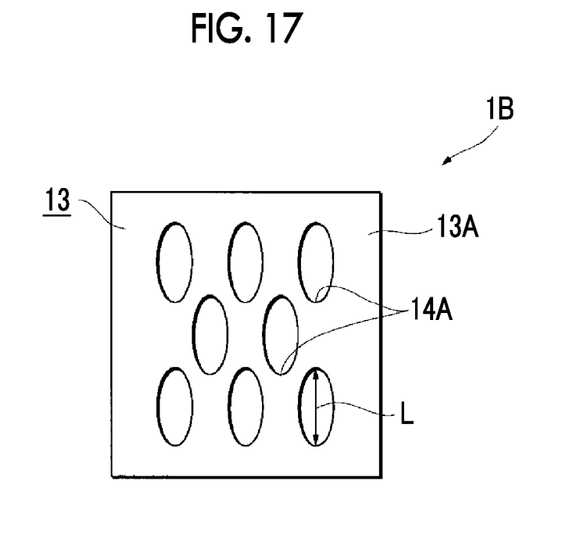
FIG. 17 is a plan view of an optical component.
Figure 18:
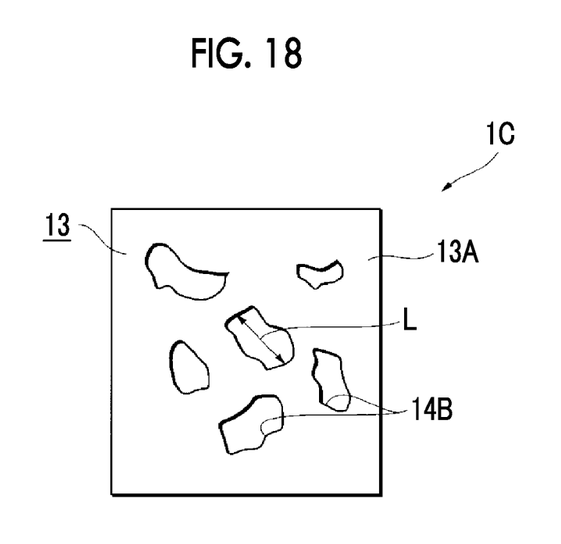
FIG. 18 is a plan view of an optical component.

FIGS. 17 and 18 are plan views of optical components 1B and 1C.

As illustrated in FIG. 17, elliptic holes 14A are formed in the antireflection material 13A. These holes 14A may not be rectangle and may be elliptic (or circular). In a case where the elliptic holes 14A are open to the antireflection material 13A, the maximum width L is a long diameter of the ellipse (in the case of a circle, a diameter).

As illustrated in FIG. 18, the indefinite holes 14B are formed in the antireflection material 13A. In a case where the indefinite holes 14B are open, the maximum width L is a length that is the longest length of the holes 14B.

In this manner, the maximum width L is a length that is maximum among opening dimensions of the holes. Holes having this maximum width L of 0.5 μm to 2.0 μm may be formed in the antireflection material 13A. The holes are not limited to circular shapes, elliptic shapes, rectangular shapes, and indefinite shapes, and may be polygonal shapes such as pentagonal shapes and hexagonal shapes. It is not necessary to form plural holes, and at least one hole that satisfies the maximum width L may be formed. Further, overall one hole in which plural holes are connected to each other by grooves may be formed.

Figure 19:
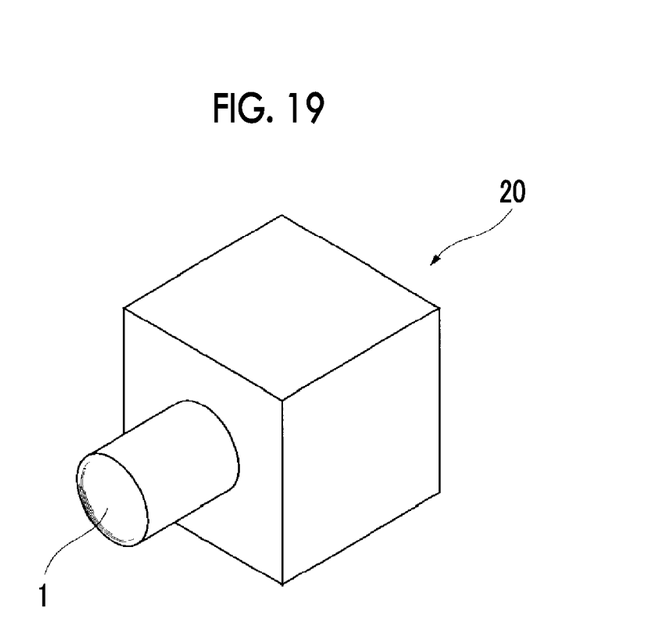
FIG. 19 is a perspective view of an infrared camera.

FIG. 19 is a perspective view of an infrared camera 20.

One of the optical component 1 (or the optical component 1A) described above is used in the infrared camera 20. Since the optical component 1 (1A) described above has favorable reflectivity characteristics, sufficient imaging light can be obtained.

Figure 20:
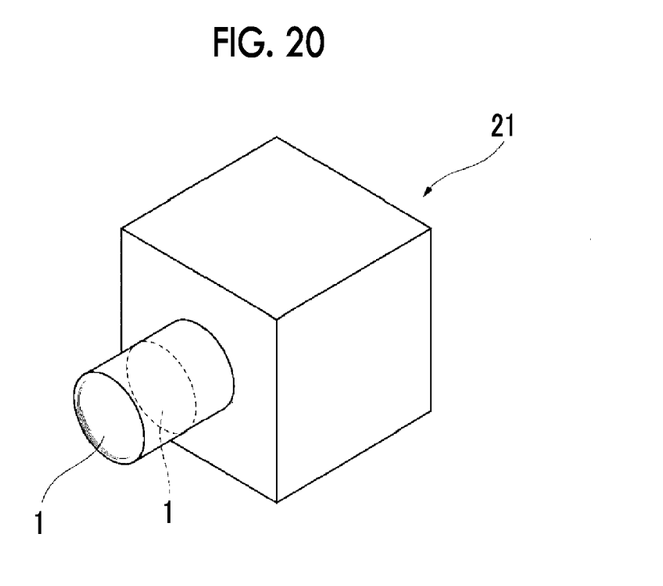
FIG. 20 is a perspective view of an infrared camera.

FIG. 20 is a perspective view of an infrared camera 21.

Plural sheets of the optical components 1 (or the optical components 1A) described above are used in the infrared camera 21. Sufficient imaging light can be obtained in this infrared camera 21.

EXPLANATION OF REFERENCES 1, 1A, 1B, 1C: optical component
2: chalcogenide glass
3, 13: antireflection film
3A, 13A: antireflection material
14: hole
L: maximum width

What is claimed is:

1. An optical component, comprising:
a chalcogenide glass with a content ratio of germanium and selenium is 60 percent or greater; and
an antireflection film in which a plurality of antireflection materials comprising a resin and diamond-like carbon particles or carbon particles, of which an extinction coefficient to light having a wavelength of 10.5 μm is 0.01 or less, and a refractive index to light having a wavelength of 10.5 μm in is greater than 1 and 2.6 or less are formed on a surface of the chalcogenide glass at a regular interval of 0.5 μm to 2.0 μm along the surface,
wherein the plurality of antireflection materials have same size and same shape with each other,
an air layer is formed between the plurality of antireflection materials, and
an equivalent refractive index of the antireflection film to light having a wavelength of 10.5 μm is 1.4 to 1.9 that is determined by an area ratio of the antireflection material occupying in a unit area of the antireflection film, is obtained by the antireflection materials and the air layer.

2. The optical component according to claim 1, wherein the antireflection materials have rectangle-shape in a plane parallel to a surface of the chalcogenide glass.

3. The optical component according to claim 2, wherein the refractive index of the antireflection materials to light having a wavelength of 10.5 μm is 2.6.

4. The optical component according to claim 3, wherein an average particle diameter of diamond-like carbon particles or carbon particles included in the antireflection film is 0.3 μm.

5. An infrared camera comprising:
the optical component according to claim 3.

6. An infrared camera comprising:
a plurality of the optical components according to claim 3.

7. The optical component according to claim 2, wherein an average particle diameter of diamond-like carbon particles or carbon particles included in the antireflection film is 0.3 μm.

8. An infrared camera comprising:
the optical component according to claim 7.

9. An infrared camera comprising:
the optical component according to claim 2.

10. An infrared camera comprising:
a plurality of the optical components according to claim 2.

11. The optical component according to claim 1, wherein the refractive index of the antireflection materials to light having a wavelength of 10.5 μm is 2.6.

12. The optical component according to claim 11, wherein an average particle diameter of diamond-like carbon particles or carbon particles included in the antireflection film is 0.3 μm.

13. An infrared camera comprising:
the optical component according to claim 11.

14. An infrared camera comprising:
a plurality of the optical components according to claim 11.

15. The optical component according to claim 1, wherein an average particle diameter of diamond-like carbon particles or carbon particles included in the antireflection film is 0.3 μm.

16. An infrared camera comprising:
the optical component according to claim 15.

17. An infrared camera comprising:
a plurality of the optical components according to claim 15.

18. An infrared camera comprising:
the optical component according to claim 1.

19. An infrared camera comprising:
a plurality of the optical components according to claim 1.

20. A method for manufacturing an optical component according to claim 1, comprising:
coating the surface of the chalcogenide glass base material of which the compositional ratio of germanium and selenium is 60 percent or greater with the antireflection materials including diamond-like carbon particles or carbon particles and having ultraviolet ray curing characteristics or characteristics of being cured with light having the specific wavelength of which an extinction coefficient to light having the wavelength of 10.5 μm is 0.01 or less, and the refractive index to light having the wavelength of 10.5 μm is greater than 1 and 2.6 or less, at the regular interval of 0.5 μm to 2.0 μm along the surface plural times, and irradiating the applied antireflection materials with ultraviolet rays or light having the specific wavelength so as to form the antireflection film of a single layer that has the equivalent refractive index to light having the wavelength of 10.5 μm in 1.4 to 1.9 that is determined by the area ratio of the antireflection material occupying in the unit area of the antireflection film.

\* \* \* \* \*